United States Patent [19]

Kohsaka et al.

[11] Patent Number: 6,072,176
[45] Date of Patent: Jun. 6, 2000

[54] LASER BEAM OPTICAL SCANNING DEVICE AND IMAGE FORMING APPARATUS WITH LASER BEAM OPTICAL SCANNING DEVICE

[75] Inventors: Jun Kohsaka, Toyokawa; Nobuo Kanai, Toyohashi, both of Japan

[73] Assignee: Minolta Co., Ltd., Osaka, Japan

[21] Appl. No.: 09/052,032

[22] Filed: Mar. 31, 1998

[30] Foreign Application Priority Data

Mar. 31, 1997 [JP] Japan ................................. 9-080445

[51] Int. Cl.[7] ....................................................... H01J 3/14
[52] U.S. Cl. ........................... 250/234; 250/235; 250/216
[58] Field of Search ............................... 250/235, 201.4, 250/208.1, 216, 201.5, 234; 358/481, 494; 359/210, 216

[56] References Cited

U.S. PATENT DOCUMENTS

| | | | |
|---|---|---|---|
| 4,800,547 | 1/1989 | Kessels et al. | 369/45 |
| 5,019,701 | 5/1991 | Yagoto et al. | 250/201.5 |
| 5,103,091 | 4/1992 | Hirose et al. | 250/235 |
| 5,122,658 | 6/1992 | Ando | 250/235 |
| 5,231,280 | 7/1993 | Imakawa | 250/201.5 |
| 5,241,174 | 8/1993 | Ando | 250/235 |
| 5,418,638 | 5/1995 | Hirasawa | 250/234 |
| 5,442,171 | 8/1995 | Anzai | 250/235 |

*Primary Examiner*—Que T. Le
*Attorney, Agent, or Firm*—Morrison & Foerster LLP

[57] ABSTRACT

A laser beam optical scanning device which focuses and scans a laser beam emitted from laser diode 1 in the arrow b direction on a photosensitive drum 40 via focusing lens 3, polygonal mirror 6, and fθ lens 7. The scanning laser beam enters a convergence state detector 10, which detects the amount of dislocation of the convergence position. The amount of positional change is calculated to correct the convergence position based on the detected amount of dislocation, and the focusing lens 3 is moved on the optical axis of the lens via motor 21 to correct the beam convergence position. When processing is executed to correct the convergence position in the intermediate zone of the image formign range and the calculated amount of positional change exceeds a limit value, a detection error is assumed, and the focusing lens 3 is moved an amount less than the limit value.

4 Claims, 3 Drawing Sheets

LASER BEAM OPTICAL SCANNING DEVICE AND IMAGE FORMING APPARATUS WITH LASER BEAM OPTICAL SCANNING DEVICE

This application is based on Application No. HEI 9-80445 filed in Japan, the content of which is hereby incorporated by reference.

BACKGROUND OF THE INVENTION

1. Field of the Invention

The present invention relates to a laser beam optical scanning device and an image forming apparatus incorporating a laser beam optical scanning device as an image printing device such as a laser printer, digital copier and the like.

2. Description of the Related Art

In recent years the laser beam optical scanning devices incorporated in laser printers and digital copiers as image printing devices have become capable of printing at high resolution to improve image quality. Therefore, the permissible depth of focus has become shallower as the laser beam spot diameter has become smaller. When optical elements and their holders are subjected to thermal expansion due to environmental fluctuation and particularly heat generated by the optical device during use, the laser beam spot diameter increases due to the shifting of the light convergence position in a longitudinal direction on the scanned surface so as to exceed tolerances necessary to obtain high image quality.

Various conventional measures have been proposed to resolve the aforesaid disadvantages. For example, U.S. Pat. No. 5,241,174 and U.S. Pat. No. 5,122,658 disclose solutions wherein a focusing lens is moved to an optimum position based on the convergence state of a laser beam detected by a sensor element provided with a single grating filter. U.S. Pat. No. 5,231,280 discloses a solution wherein a focusing lens is moved to an optimum position based on the convergence state of a laser beam detected by a sensor comprising a photoelectric conversion element and a knife edge disposed at a different position relative to the scanned surface.

In such conventional devices, however, focusing errors occur when a suitable amount of position displacement is not obtained due to the influence of noise and the like contaminating the detector. Japanese Laid-Open Patent Application No. HEI 2-296210 discloses a solution wherein a focusing lens is moved to a focus position based on design when the shifting of the convergence position cannot be adequately detected. The convergence state is not necessarily satisfactory even when the focusing lens is returned to a design-based focus position, however.

SUMMARY OF THE INVENTION

An object of the present invention is to provide a laser beam optical scanning device and an image forming apparatus provided with said device which is capable of preventing focusing error as far as possible.

These objects are attained by one aspect of the present invention which provides an optical element to correct the convergence position of laser beam emitted from a laser light source, a driver to move said optical element to correct said convergence position, a detector disposed at optically equivalent position to a scanned surface, and controller to calculate the amount of positional displacement to correct the beam convergence position based on the detection signal of said detector and control said driver by said displacement amount. This controller executes processing to correct the beam convergence position between the image forming operation of one page and the image forming operation of a next page, and controls said driver within limit values when the calculated amount of positional displacement exceeds a limit value.

When the beam convergence position is corrected between each page, it is unlikely that the temperature will fluctuate markedly after the immediately preceding correction process, such that a likely temperature change is deemed normally to be about 1~4° C. For example, when a displacement corresponding to a temperature difference of 4° C. is preset as a limit value, and the actual calculated amount of displacement exceeds said limit value, the driver is controlled either by said limit value or a predetermined value below said limit value.

That is, when the calculated amount of change exceeds a normal temperature fluctuation, it is assumed an error has occurred due to noise contamination or the like, and the amount of change is limited.

These and other objects, advantages and features of the present invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
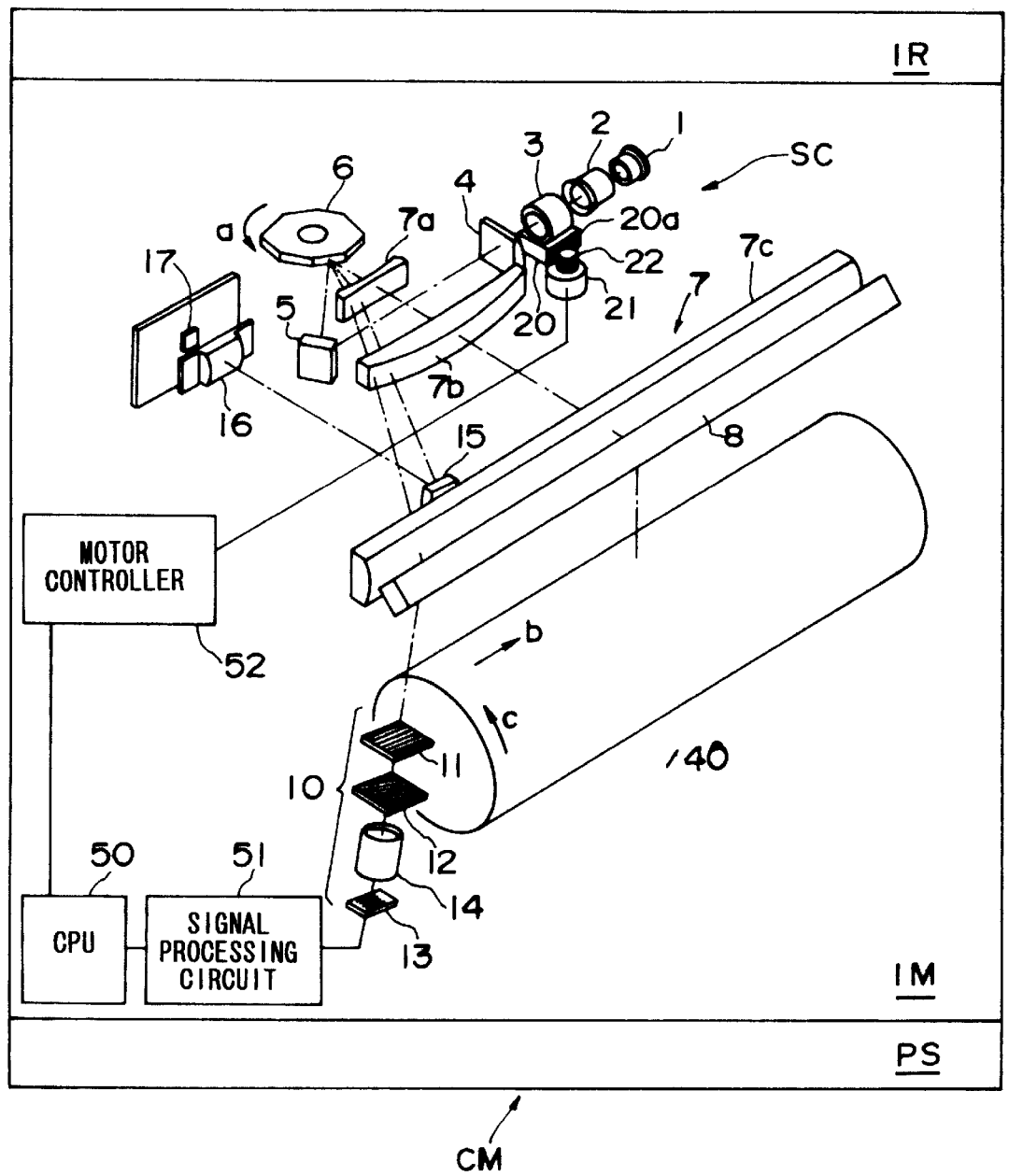
FIG. 1 is a perspective view of an embodiment of the present invention.

The preferred embodiments of the present invention are described hereinafter with reference to the accompanying drawings. FIG. 1 shows a digital copier CM incorporating a laser beam optical scanning device. The digital copier CM comprises an image reader IR, image forming unit IM, and copy sheet supply unit PS. A laser beam optical scanning device SC is provided in the image forming unit IM. The laser beam optical scanning device SC comprises a laser diode 1 to form images, collimator lens 2, focusing lens 3, cylindrical lens 4, plane mirror 5, polygonal mirror 6, fθ lens 7 (comprising lenses 7a, 7b, 7c), and plane mirror 8. A plane mirror 15, cylindrical lens 16, photosensor 17, and beam convergence state detector 10 are provided to detect the start of scan timing.

Laser diode 1 is controllably modulated (turned ON and OFF) based on image data input to a drive circuit not shown in the drawing, and emits a laser beam when turned ON. This laser beam is collimated by collimator lens 2, the beam convergence position is corrected by focusing lens 3 (described later), and arrives at polygonal mirror 6 via cylindrical lens 4 and plane mirror 5.

Polygonal mirror 6 is driven in rotation at constant speed in the arrow a direction. The laser beam is deflected at equiangular speed by each deflection surface based on the rotation of polygonal mirror 6, and enters fθ lens 7. The laser beam passes through fθ lens 7 and is reflected by plane mirror 8, and thereafter converges on the surface of photosensitive drum 40, so as to scan the surface of said photosensitive drum 40 in the arrow b direction. The fθ lens 7 mainly corrects the main scan speed of the laser beam deflected at equiangular speed by said polygonal mirror 6 to a uniform speed on the scanned surface (i.e., photosensitive drum 40), that is, fθ lens 7 has the function of correcting distortion. The photosensitive drum 40 is driven in rotation in the arrow c direction, such that an image (electrostatic latent image) is formed on the surface of the photosensitive drum 40 via the main scan in the arrow b direction via polygonal mirror 6 and fθ lens 7, and the subscan in the arrow c direction of photosensitive drum 40.

The laser beam at the tip of the laser beam in the main scan direction is reflected by a plane mirror 15, is transmitted through cylindrical mirror 16, and enters sensor 17. A beam detection signal output from sensor 17 generates a vertical synchronizing signal to determine print start position of each individual scan line.

Focusing lens 3 is mounted on a baseplate 20, and the output pinion gear 22 of stepping motor 21 engages a rack 20a formed on the lateral edge of baseplate 20. Focusing lens 3 is movable along the optical axis of said lens 3 via the forward rotation or reverse rotation of stepping motor 21 in accordance with signals transmitted from a motor controller 52, so as to correct the convergence position of the laser beam on the surface of photosensitive drum 40 via said movement.

The beam convergence state detector 10 is disposed at an optically equivalent position to the scanned surface at the side of photosensitive drum 40 to detect the convergence state of said laser beam on the scanned surface. Specifically, the beam convergence state detector 10 comprises grating filters 11 and 12, photoelectric conversion element 13, and a condensing lens 14 interposed between said filter 12 and element 13. Filter 11 has a spatial grating parallel to the main scan direction b, and filter 12 has a spatial grating inclined relative to the main scan direction b. A laser beam passing through filters 11 and 12 forms a moiré fringe which is detected by the photoelectric conversion element 13.

A detection signal transmitted from photoelectric conversion element 13 is input to a signal processing circuit 51, which calculates the amount and direction of positional change (i.e., whether the convergence position is shifted in front of or behind a standard position) of the convergence position. The calculated value is transmitted to a central processing unit (CPU) 50 which calculates the amount of positional change necessary to move the focusing lens 3 on the optical axis from the shifted convergence position to align the convergence position on the scanned surface, and outputs this change amount to motor controller 52.

Figure 2:
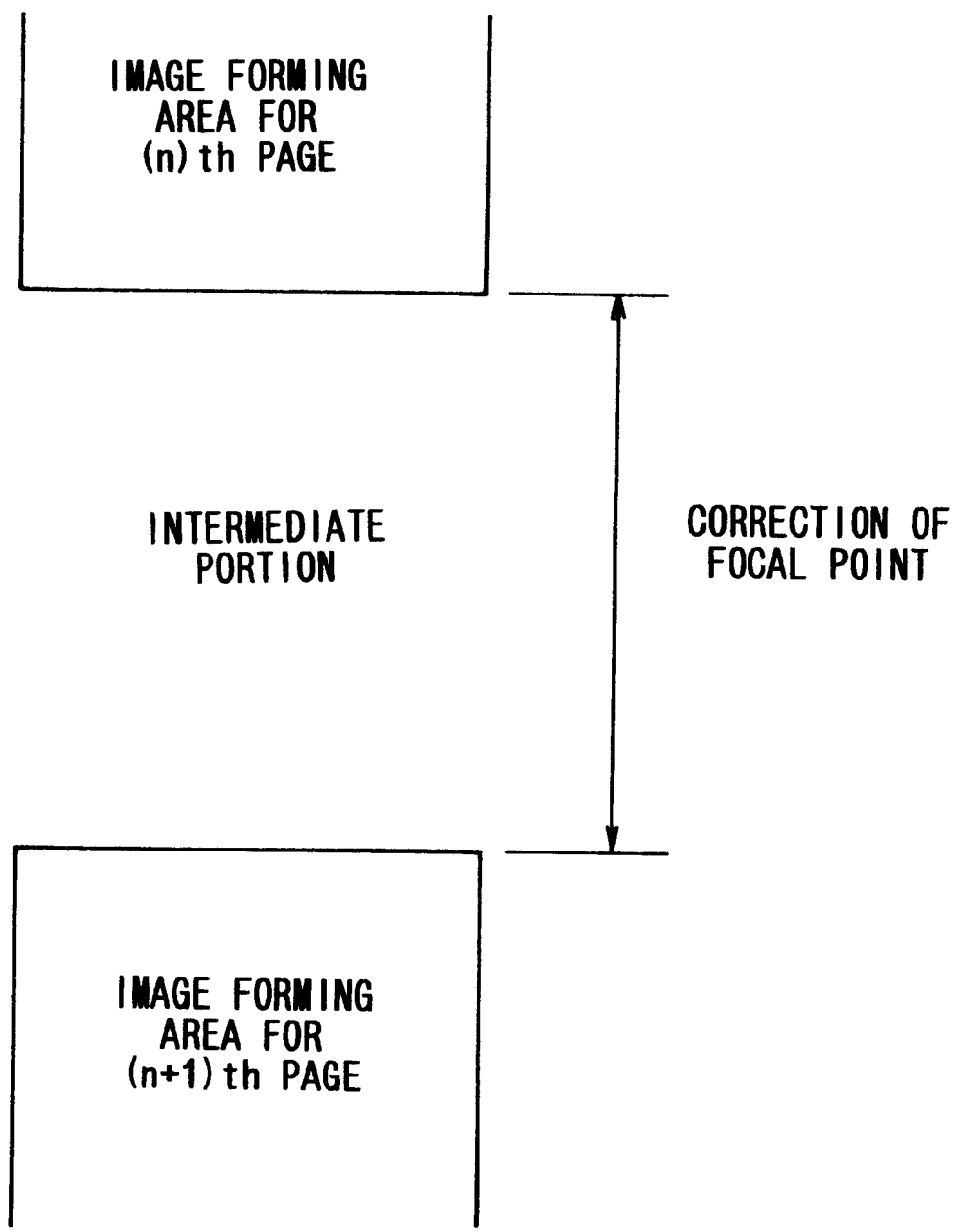
FIG. 2 illustrates the process of correcting the beam convergence position in said embodiment.

In the present embodiment, stepping motor 21 moves the focusing lens 3 a distance of 25 μm per single pulse of drive signal. In the optical system, the convergence position is shifted about 1.5 mm via a temperature fluctuation of 25° C. The amount of positional dislocation of focusing lens 3 relative to shifted convergence position is set at a relationship of 1:2. The process of correcting the convergence position is executed directly prior to the start of printing, and executed between the image forming range of each page as shown in FIG. 2 when a plurality of pages are sequentially printed (i.e., during the non-printing time zone; this time zone is referred to as the "intermediate zone" hereinafter). The correction process directly before the start of printing and in the intermediate zone is accomplished by repeating the following processes until focus is attained: sensing via detector 10, processing the detection signal by signal processing circuit 51, calculating the amount of positional change by detector 10, and processing sequential movement of focusing lens 3 via motor 21.

In the correction process in the intermediate zone in particular, the temperature fluctuation may assumed beforehand at about 1~4° C. without considering the marked fluctuation of the temperature of the optical system wen printing one page. The temperature fluctuation of 4° C. is equivalent to 0.24 mm displacement of the convergence position. In the present embodiment, this value is set as a limit value, such that the focusing lens 3 is moved by actuating the motor 21 for a displacement amount if the amount of positional displacement calculated by CPU 50 is within this limit value. On the other hand, when the calculated positional displacement amount exceeds this limit value, the focusing lens 3 is moved only by a displacement amount equivalent to this limit value. That is, When the calculated displacement amount is outside the predetermined limit range, detector 10 is assumed to have had a sensing error due to noise or the like causing an increase in the amount, and the convergence position correction is restricted. Focusing errors are therefore prevented before they occur, so as to allow rapid convergence position correction processing between pages.

Figure 3:
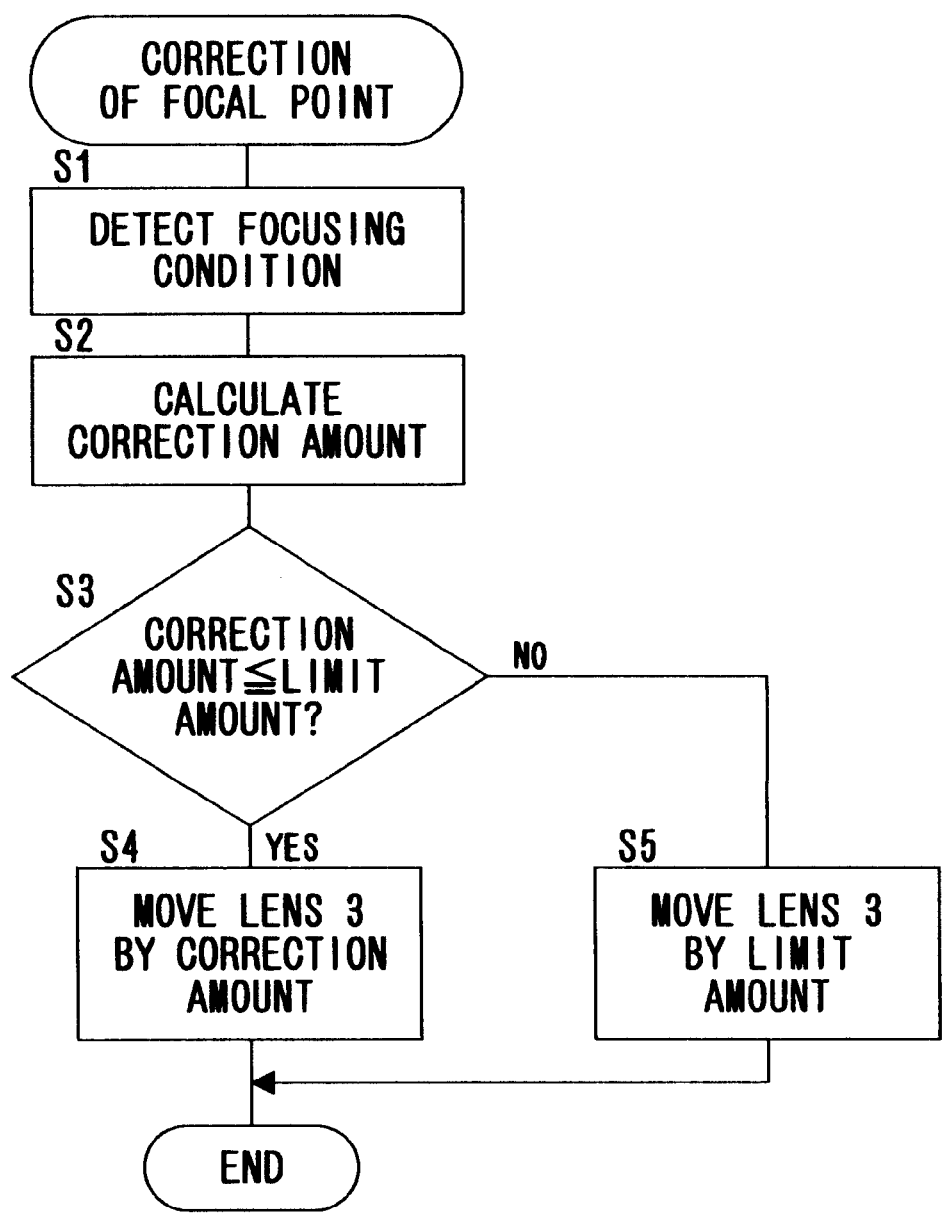
FIG. 3 is a flow chart showing the control sequence of the beam convergence position correction process in said embodiment.

FIG. 3 shows the controller of the beam convergence position correction process executed in the intermediate zone. First, in step S1, the beam convergence state (amount of dislocation) is detected by the signal processing circuit 51 based on the detection signals from detector 10. Then, in step S2, the amount of positional change of focusing lens 3 is calculated by CPU 50 based on the amount of dislocation. In step S3, the amount of change is compared to a limit value, and when the amount of change is less than the limit value, the motor 21 is operated only the amount of said change to move the focusing lens 3 in step S4. On the other hand, when the amount of change exceeds the limit value, the motor 21 is operated only the limit value amount to move the focusing lens 3 in step S5.

The laser beam scanning optical device of the present invention is not limited to the previously described embodiment, and may be variously modified insofar as such modifications do not depart from the scope of the invention.

In particular, the driver of the focusing lens 3 may be a means other than the stepping motor 21 insofar as the means accurately controls minute amounts of movement, such as an actuator using a linear motor or piezoelectric element.

When the calculated amount of positional change exceeds the limit value, the focusing lens 3 need not be moved by the amount of the limit value and may be moved by a predetermined value less than said limit value.

The beam convergence state detector need not use moiré fringe, and may comprise a photoelectric conversion element and knife edge, a device using various types of grating filters and the like.

The type and arrangement of optical elements such as the fθ lens may be optionally selected, and the laser beam deflection means need not be a polygonal mirror insofar as scanning devices using acousto-optic effect may also be used.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image forming apparatus for forming an image on a page, comprising:

a laser beam light source which emits a laser beam;

an optical element which corrects a convergence position of the laser beam;

a driver which moves said optical element to correct said convergence position;

a detector disposed at an optically equivalent position to a scanned surface and which detects a convergence condition of the laser beam; and a controller which calculates an amount of positional displacement of the convergence position to correct the beam convergence position based on the detected convergence condition of the laser beam and controls said driver by said displacement amount, wherein said controller executes processing to correct the beam convergence position between an image forming operation of one page and an image forming operation of a next page, and, when the calculated amount of positional displacement exceeds a limit value, said controller controls said driver to move said optical element so as to be within the limit value.

2. An image forming apparatus according to claim 1, wherein said controller memorizes an amount of positional displacement for correction corresponding to a predetermined temperature difference.

3. A laser beam scanning device for forming an image on a page, comprising:

an optical element which corrects a convergence position of a laser beam emitted from a laser light source;

a driver which moves said optical element to correct said convergence position;

a detector disposed at an optically equivalent position to a scanned surface and which detects a convergence condition of the laser beam; and a controller which calculates an amount of positional displacement of the convergence position to correct the beam convergence position based on the detected convergence condition of the laser beam and controls said driver by said displacement amount, wherein said controller executes processing to correct the beam convergence position between an image forming operation of one page and an image forming operation of a next page, and, when the calculated amount of positional displacement exceeds a limit value, said controller controls said driver to move said optical element so as to be within the limit value.

4. A laser beam scanning device according to claim 3, wherein said controller memorizes an amount of positional displacement for correction corresponding to a predetermined temperature difference.

* * * * *